US008842624B2

(12) United States Patent
Trachewsky

(10) Patent No.: US 8,842,624 B2
(45) Date of Patent: Sep. 23, 2014

(54) COMMUNICATION GATEWAY SUPPORTING WLAN COMMUNICATIONS IN MULTIPLE COMMUNICATION PROTOCOLS AND IN MULTIPLE FREQUENCY BANDS

(75) Inventor: Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/492,291

(22) Filed: Jun. 8, 2012

(65) Prior Publication Data

US 2012/0243494 A1 Sep. 27, 2012

Related U.S. Application Data

(62) Division of application No. 10/619,829, filed on Jul. 15, 2003, now Pat. No. 8,228,849.

(60) Provisional application No. 60/395,923, filed on Jul. 15, 2002, provisional application No. 60/396,442, filed on Jul. 16, 2002, provisional application No. 60/400,492, filed on Aug. 2, 2002, provisional application No. 60/409,503, filed on Sep. 10, 2002.

(51) Int. Cl.
*H04W 4/00* (2009.01)
*H04W 48/20* (2009.01)
*H04W 84/12* (2009.01)
*H04W 84/18* (2009.01)

(52) U.S. Cl.
CPC .............. *H04W 48/20* (2013.01); *H04W 84/12* (2013.01); *H04W 84/18* (2013.01)
USPC ........... 370/329; 370/338; 370/328; 455/450; 455/452.1; 455/452.2; 455/453

(58) Field of Classification Search
CPC .......... H04W 72/0453; H04W 72/087; H04W 76/02
USPC ............... 370/328, 329, 338; 455/450, 452.1, 455/452.2, 451
See application file for complete search history.

(56) References Cited

U.S. PATENT DOCUMENTS

| 5,005,946 | A  | * | 4/1991 | Brandstetter | 359/15 |
| 6,732,163 | B1 | * | 5/2004 | Halasz | 709/220 |
| 6,924,755 | B1 | * | 8/2005 | Callanan et al. | 341/118 |
| 2001/0046216 | A1 | * | 11/2001 | Carpelan | 370/329 |
| 2002/0197984 | A1 | * | 12/2002 | Monin et al. | 455/419 |
| 2003/0059034 | A1 | * | 3/2003 | Etter | 379/392.01 |

* cited by examiner

*Primary Examiner* — Wayne Cai
(74) *Attorney, Agent, or Firm* — Garlick & Markison; Kevin L. Smith

(57) ABSTRACT

Provided is operation of a device in a plurality of frequency bands. A packet based network selects a frequency band of operation by determining a quality indicator. The WLAN further selects a communication protocol. WLAN devices include a baseband processor interface and a first radio for receiving the digital data and for transmitting RF signals in first and second frequency bands of a plurality of frequency bands, and for producing corresponding digital data to the baseband processor interface.

20 Claims, 14 Drawing Sheets

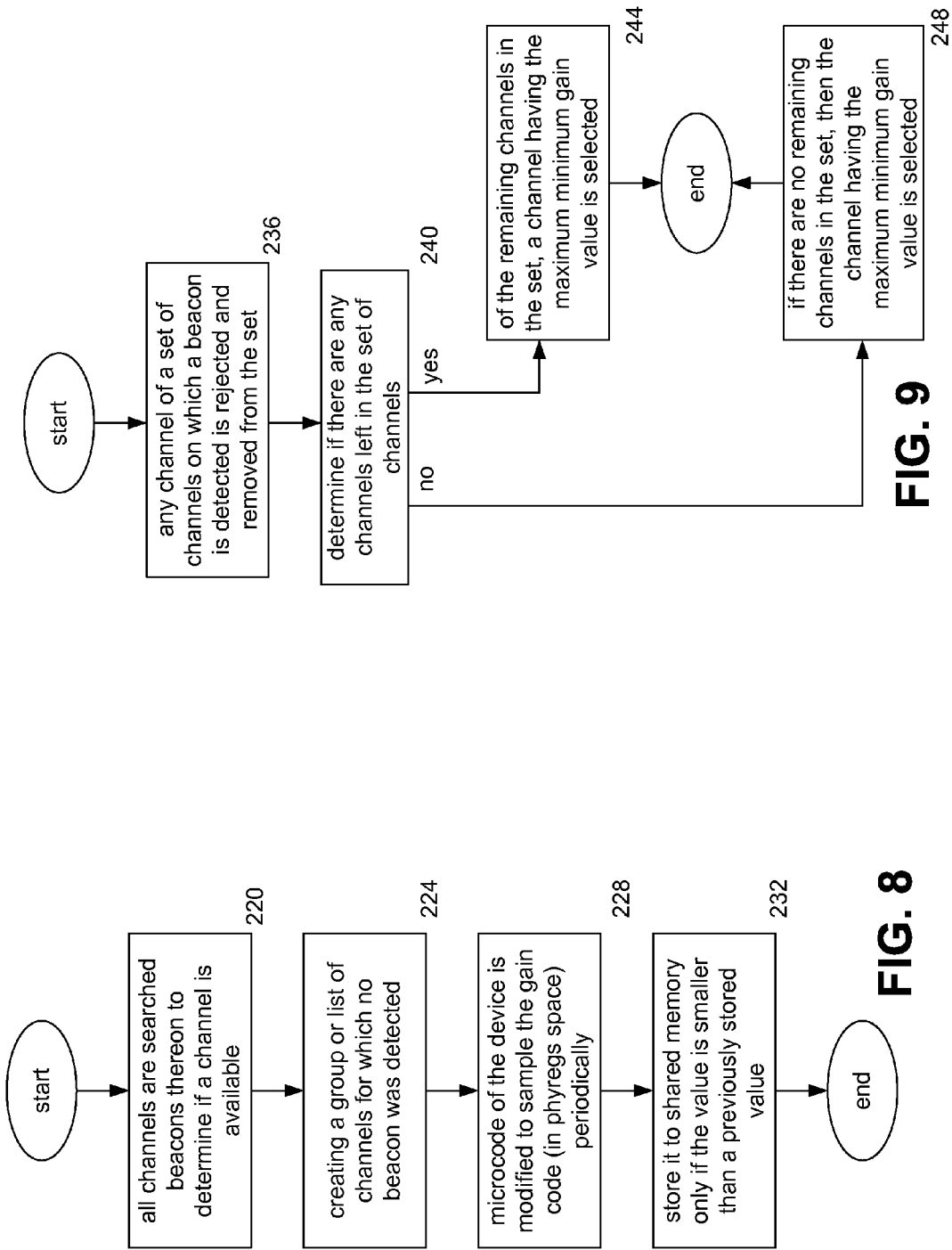

COMMUNICATION GATEWAY SUPPORTING WLAN COMMUNICATIONS IN MULTIPLE COMMUNICATION PROTOCOLS AND IN MULTIPLE FREQUENCY BANDS

CROSS REFERENCE TO RELATED APPLICATION

The present U.S. Utility patent application claims priority pursuant to 35 U.S.C. §§120, 121, as a divisional, to the following U.S. Utility patent application, which is hereby incorporated herein by reference in its entirety and made part of the present U.S. Utility patent application for all purposes:

1. U.S. Utility application Ser. No. 10/619,829, entitled "COMMUNICATION GATEWAY SUPPORTING WLAN COMMUNICATIONS IN MULTIPLE COMMUNICATION PROTOCOLS AND IN MULTIPLE FREQUENCY BANDS," filed Jul. 15, 2003, now issued as U.S. Pat. No. 8,228,849, on Jul. 24, 2012, which claims priority pursuant to 35 U.S.C. §119(e) to the following U.S. Provisional Patent Applications, which are hereby incorporated herein by reference in their entirety and made part of the present U.S. Utility patent application for all purposes:

a. U.S. Provisional Application Ser. No. 60/395,923, entitled "COMMUNICATION GATEWAY SUPPORTING WLAN COMMUNICATIONS IN MULTIPLE FREQUENCY BANDS AND ACCORDING TO MULTIPLE COMMUNICATION PROTOCOLS," filed Jul. 15, 2002.

b. U.S. Provisional Application Ser. No. 60/396,442, entitled "BAND AND PROTOCOL SELECTION LOGIC FOR WIRELESS LANS," filed Jul. 16, 2002.

c. U.S. Provisional Application Ser. No. 60/400,492, entitled "CHANNEL SELECTION LOGIC FOR WIRELESS LANS," filed Aug. 2, 2002.

d. U.S. Provisional Application Ser. No. 60/409,503, entitled "COMMUNICATION GATEWAY SUPPORTING WLAN COMMUNICATIONS IN MULTIPLE FREQUENCY BANDS AND ACCORDING TO MULTIPLE COMMUNICATION PROTOCOLS," filed Sep. 10, 2002.

SPECIFICATION

1. Technical Field

This instant technology relates generally to the wireless communications; and more particularly relates to the management of wireless networks.

2. Background

Communication technologies that link electronic devices in a networked fashion are well known. Examples of communication networks include wired packet data networks, wireless packet data networks, wired telephone networks, wireless telephone networks, and satellite communication networks, among other networks. These communication networks typically include a network infrastructure that services a plurality of client devices. The Public Switched Telephone Network (PSTN) is probably the best-known communication network that has been in existence for many years. The Internet is another well-known example of a communication network that has also been in existence for a number of years. These communication networks enable client devices to communicate with each other on a global basis. Wired Local Area Networks (LANs), for example, Ethernets, are also quite common and support communications between networked computers and other devices within a serviced area. LANs also often link serviced devices to Wide Area Networks and the Internet. Each of these networks is generally considered a "wired" network, even though some of these networks, for example, the PSTN, may include some transmission paths that are serviced by wireless links.

Wireless networks have been in existence for a relatively shorter period. Cellular telephone networks, wireless LANs (WLANs), and satellite communication networks, among others, are examples of wireless networks. Relatively common forms of WLANs are IEEE 802.11(a) networks, IEEE 802.11(b) networks, and IEEE 802.11(g) networks, referred to jointly as "IEEE 802.11 networks." In a typical IEEE 802.11 network, a wired backbone couples to a plurality of Wireless Access Points (WAPs), each of which supports wireless communications with computers and other wireless terminals that include compatible wireless interfaces within a serviced area. The wired backbone couples the WAPs of the IEEE 802.11 network to other networks, both wired and wireless, and allows serviced wireless terminals to communicate with devices external to the IEEE 802.11 network.

WLANs provide significant advantages when servicing portable devices such as portable computers, portable data terminals, and other devices that are not typically stationary and able to access a wired LAN connection. However, WLANs provide relatively low data rate service as compared to wired LANs, for example, IEEE 802.3 networks. Currently deployed wired networks provide up to one Gigabit/second bandwidth and relatively soon, wired networks will provide up to 10 Gigabit/second bandwidths. However, because of their advantages in servicing portable devices, WLANs are often deployed so that they support wireless communications in a service area that overlays with the service area of a wired network. In such installations, devices that are primarily stationary, for example, desktop computers, couple to the wired LAN while devices that are primarily mobile, for example, laptop computers, couple to the WLAN. The laptop computer, however, may also have a wired LAN connection that it uses when docked to obtain relatively higher bandwidth service.

With the continual advancement of technology, WLAN devices will include transceivers that may connect to other transceivers in a band extending from 2.4 to 2.5 GHz or in a band extending from 5.15 to 5.875 GHz. Transmissions in the 2.4 to 2.5 GHz band may conform to the IEEE 802.11(b)-1999 standard or to the developing standard in IEEE 802.11 (g) Task Group G standards. Transmissions in the 5.15 to 5.875 GHz band may conform to the IEEE 802.11(a)-1999 standard. These operating standards define the operation within respective bands, for example channelization, signal format, etc. Thus, operation within each of these bands may be serviced according to one of a plurality of available operating standards.

Managing operation for wireless terminals within the plurality of available bands according to the plurality of protocol standards is difficult. Determining within which band to operate and determining which protocol standard to select is not defined in any of the above-referenced operating standards. Moreover, determining which channel to select in the band under these conditions is not defined in the above referenced operating standards. Thus, there is a need for a method of operation in a WLAN for supporting a plurality of available bands and a plurality of protocol standards.

BRIEF DESCRIPTION OF THE DRAWINGS

These and other features, aspects and advantages of the present invention will be more fully understood when considered with respect to the following detailed description, appended claims and accompanying drawings wherein:

FIGS. 8 and 9 are flow charts illustrating methods for selecting a channel according to an embodiment of the present invention;

DETAILED DESCRIPTION OF THE DRAWINGS

Figure 13:
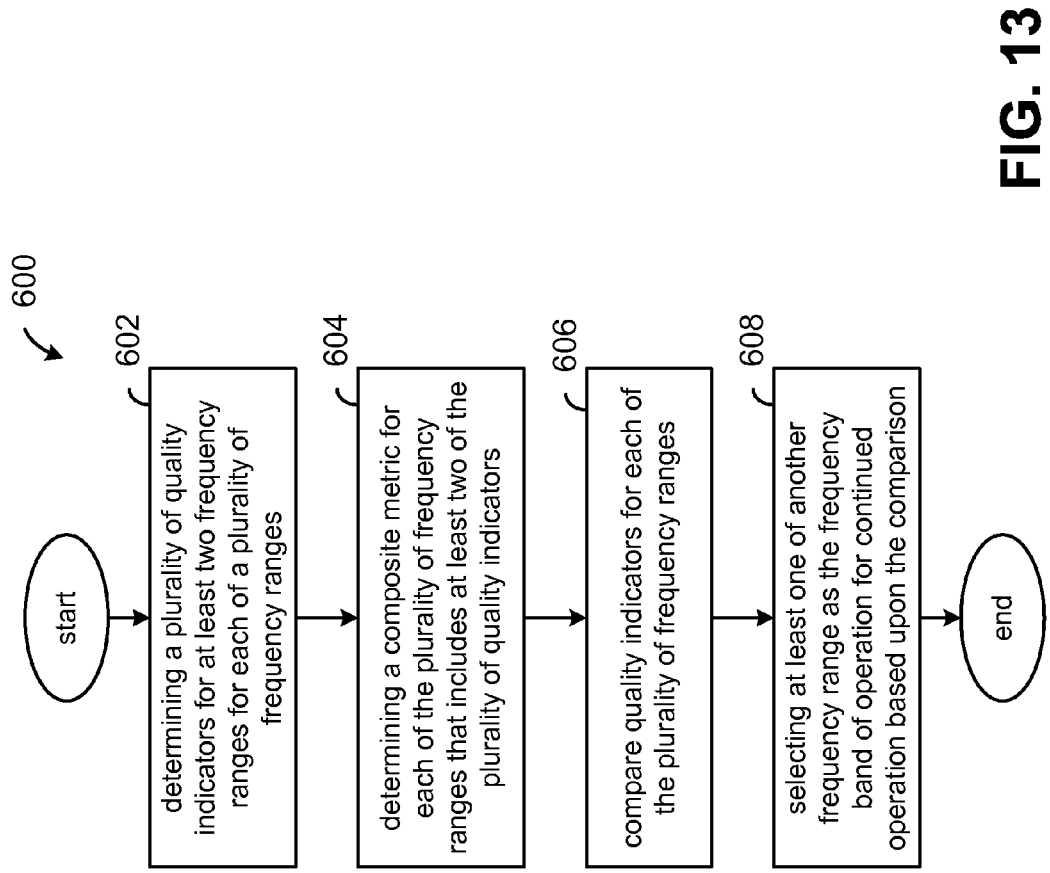
FIG. 13 is a flow chart illustrating a method for selecting a channel according to an embodiment of the present invention.

Provided is operation in a plurality of frequency bands (and ranges not necessarily limited to defined bands). For example, FIG. 13 illustrates a method 600 in which the operation involves a Wireless Local Area Network (WLAN) selecting a frequency band of operation of a plurality of frequency bands supported by a WLAN device by, for each of the plurality of frequency ranges supported by the WLAN device, determining, at step 602, a quality indicator for at least one frequency range, determining, at step 604, a composite quality indicator for each of the plurality of frequency ranges, and, based upon a comparison of the quality indicators for each of the plurality of frequency ranges at step 606, selecting, at step 608, at least one frequency range for continued operation. The WLAN searches each channel of a group of channels to determine whether a beacon is detected.

In addition to selecting a frequency range (or a channel within a frequency range), the operation may further include selecting a communication protocol for operation from a plurality of available communication protocols. The WLAN selects at least two frequency bands and communicates over at least one channel in each of the two frequency bands.

WLAN devices includes a first baseband processor interface for receiving, processing and generating digital data, a first radio for receiving the digital data and for transmitting RF signals in a first frequency band and for receiving RF signals in the first frequency band and for producing corresponding digital data to the first baseband processor interface, a second baseband processor interface for receiving, processing and generating digital data and a second radio for receiving the digital data and for transmitting RF signals in a first frequency band and for receiving RF signals in the first frequency band and for producing corresponding digital data to the second baseband processor interface. The WLAN device further includes logic for determining a quality indicator, wherein the quality indicator for a selected channel considers a channel power and interference power for the selected channel as described above.

Also, the WLAN device includes first and second radio interfaces wherein the first baseband processor communicates with the first baseband processor interface by way of the first radio interface and with the second baseband processor interface by way of the second radio interface. In a different embodiment, the WLAN device includes first and second radio interfaces and a second baseband processor wherein the first baseband processor communicates with the first baseband processor interface by way of the first radio interface and the second baseband processor communicates with the second baseband processor interface by way of the second radio interface.

Figure 1:
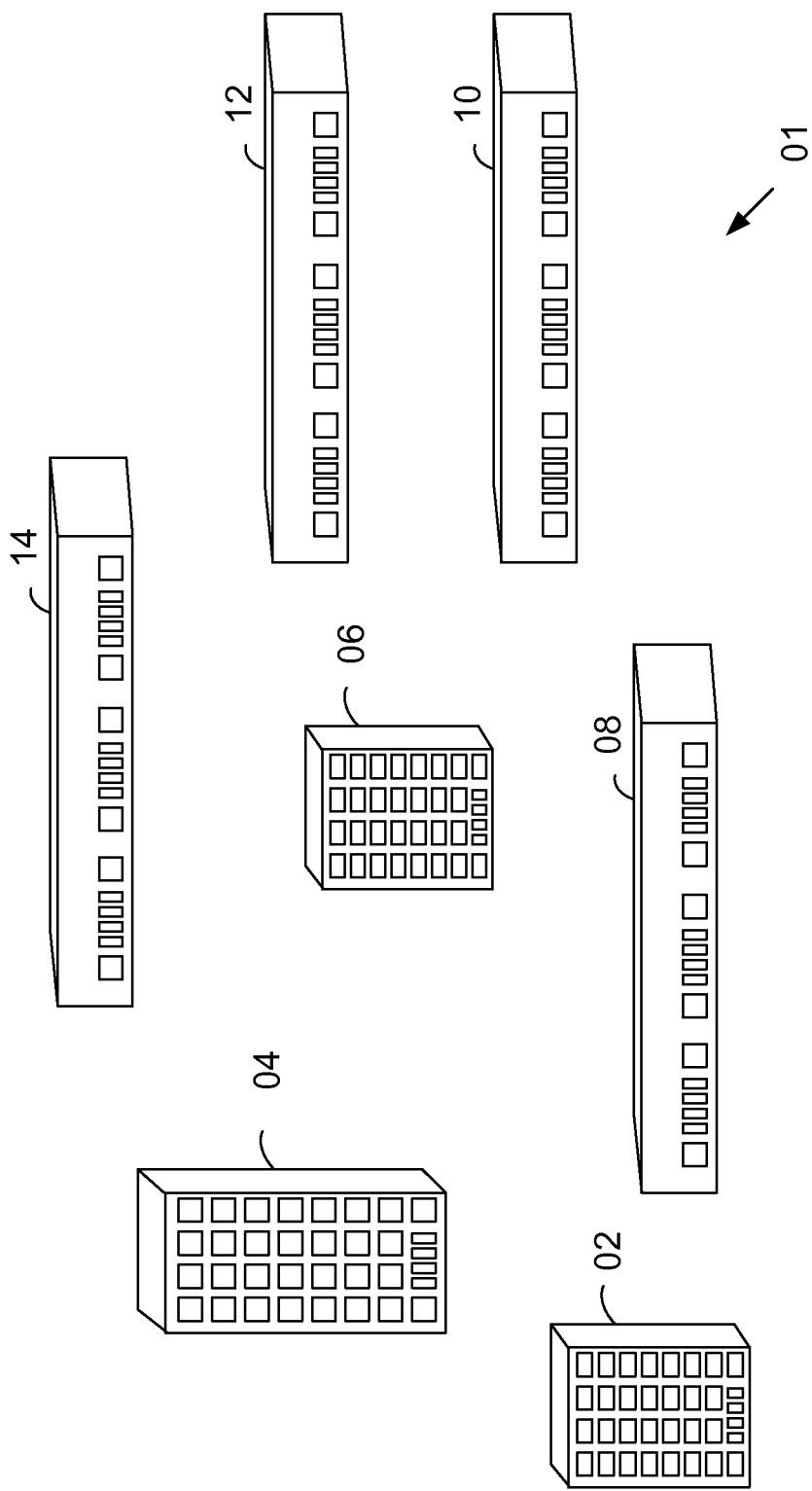
FIG. 1 is a system diagram illustrating a premises in which a network constructed according to an embodiment of the present invention is deployed.

FIG. 1 is a system diagram illustrating a premises 01 in which a network constructed according to the present invention is deployed. The premises 01 (campus) includes office buildings 02, 04, 06 and industrial buildings 08, 10, 12, and 14. The premises 01 may correspond to a company such as a technology company, a seller of goods, a service company, or another type of company. Contained within each of the office buildings 02, 04, and 06 are a number of offices, each of which provides a working space for at least one person. Each of the industrial buildings 08, 10, 12, and 14 provides space for manufacturing, storage, or another purpose. Industrial buildings 08, 10, 12, and 14 each also provide working space for at least one person.

Contained within each of these buildings 02-14 are computer workstations, computer servers, printers, FAX machines, phones, and other electronic devices. Each of these electronic devices has its communication requirements. For example, computer workstations, computer servers, and printers each require data communication service. Such data communication service requires that the devices can communicate with other devices located within the premises and with devices located external to the premises 01 across one or more data networks. The FAX machines and phones require coupling to one another and to the Public Switched Telephone Network (PSTN).

Both wired and wireless communications are supported within the premises 01 via a network that provides both wired Local Area Network (LAN) and Wireless Local Area Network (WLAN) functionality. The manner in which the network is constructed and the manner in which the wired LAN and WLAN functionality are provided and operated are described further with reference to FIGS. 2 through 12.

Figure 2:
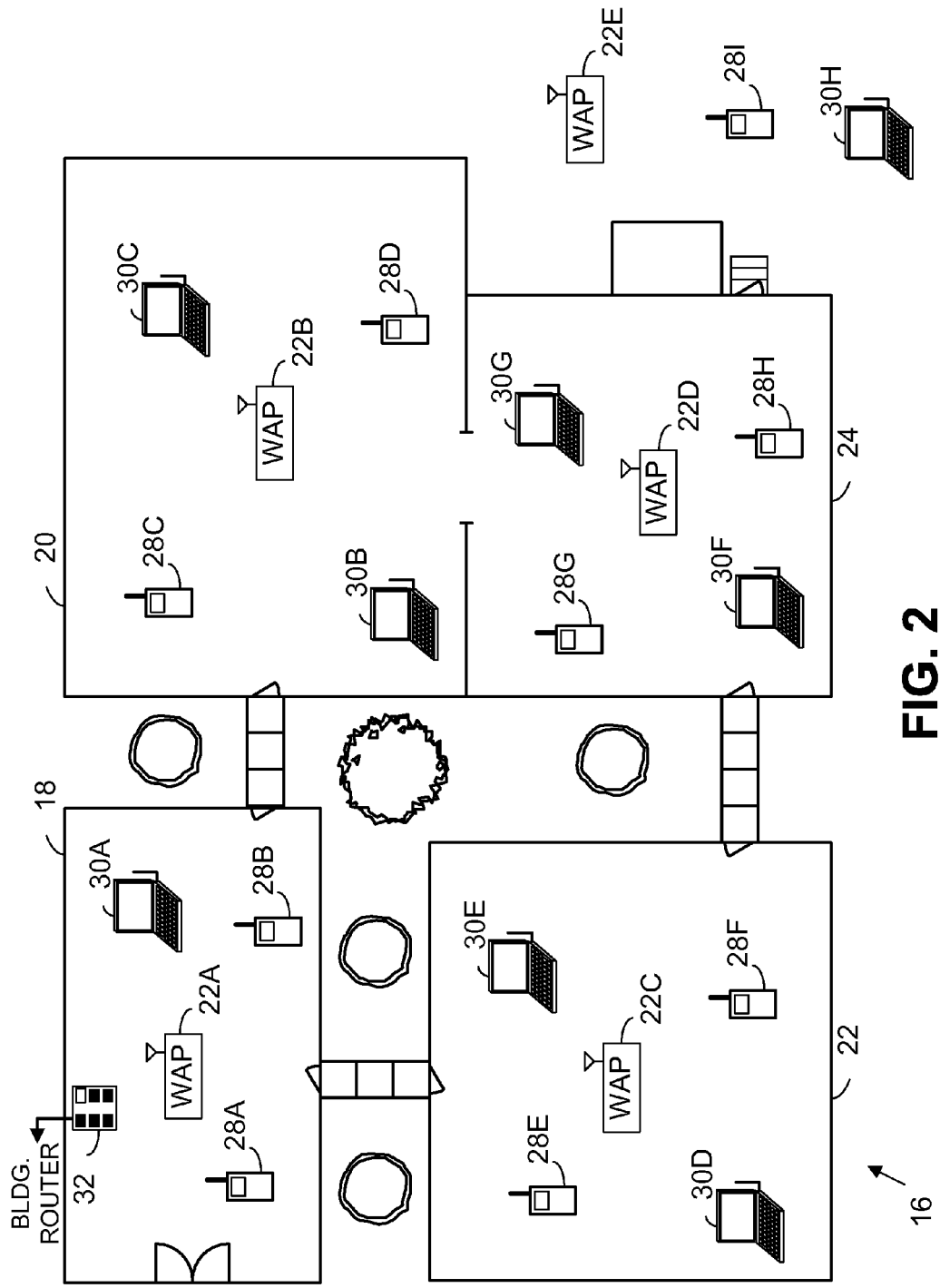
FIG. 2 is a system diagram illustrating a portion of a campus in which wireless communications are serviced according to an embodiment of the present invention.

FIG. 2 is a partial system diagram illustrating a portion of a campus in which wireless communications are serviced according to an embodiment of the present invention. A building floor 16 shown in FIG. 2 is part of the campus and may be a lower floor of one of the buildings of FIG. 1, for example, building 02. The building floor 16 includes a plurality of rooms 18, 20, 22, and 24. Each of these rooms 18, 20, 22, and 24 includes a Wireless Access Point (WAP) 22A, 22B, 22C, and 22D, respectively, that services a corresponding area. Further, an external WAP 22E provides service external to room 24 of building floor 16. Each of these WAPs 22A-22E couples to a servicing building router via a building router 32 for the building floor 16.

Serviced within the building floor 16 are wireless terminals 28A-28I and laptop computers 30A-30H. Each of these devices wirelessly communicates with a servicing WAP. For example, laptop computer 30A and wireless terminals 28A and 28B wirelessly communicate with WAP 22A (in their illustrated positions). Each of the WAPs 22A-22D supports wireless communications primarily within a designated area, rooms 18-24, respectively. However, the coverage area of each WAP 22A-22D extends beyond the boundaries of its respective rooms 18-24 so that overlapping coverage areas exist. For example, WAPs 22A and 22C provide service between rooms 18 and 22 so that wireless terminals that roam between the rooms continue to receive wireless communication service when between the rooms 18 and 22. Further, WAP 22E supports wireless communications outside of the floor 16 to service laptop computer 30H and wireless terminal 28I. According to one aspect, WAPs with overlapping coverage operate according to differing protocols and/or bands.

Figure 3:
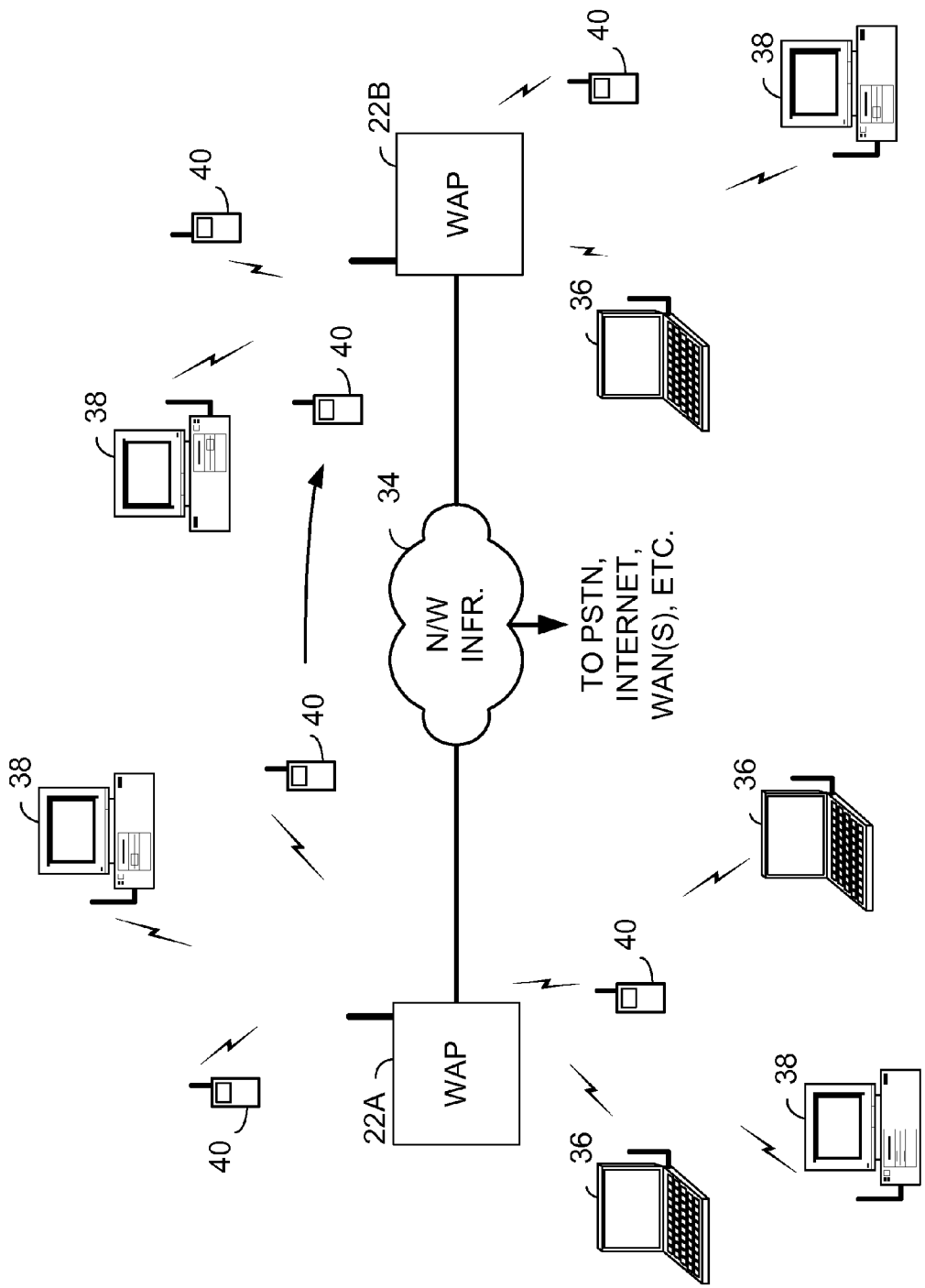
FIG. 3 is a block diagram partially illustrating a portion of the network of FIG. 2 that supports operations according to an embodiment of the present invention.

FIG. 3 is a block diagram partially illustrating a portion of the network of FIG. 2 that supports operations according to the present invention. The portion of the network shown includes WAPs 22A and 22B that support wireless communications within a jointly serviced area, for example, the rooms 20 and 24 of FIG. 2. The WAPs 22A and 22B couple to the network infrastructure 34. The WAPs 22A and 22B service wireless communications for laptop computers 36, desktop computers 38, and wireless terminals 40. The service coverage areas provided by WAPs 22A and 22B overlap at least partially. The network infrastructure 34 couples to one or more data networks.

Figure 4A:
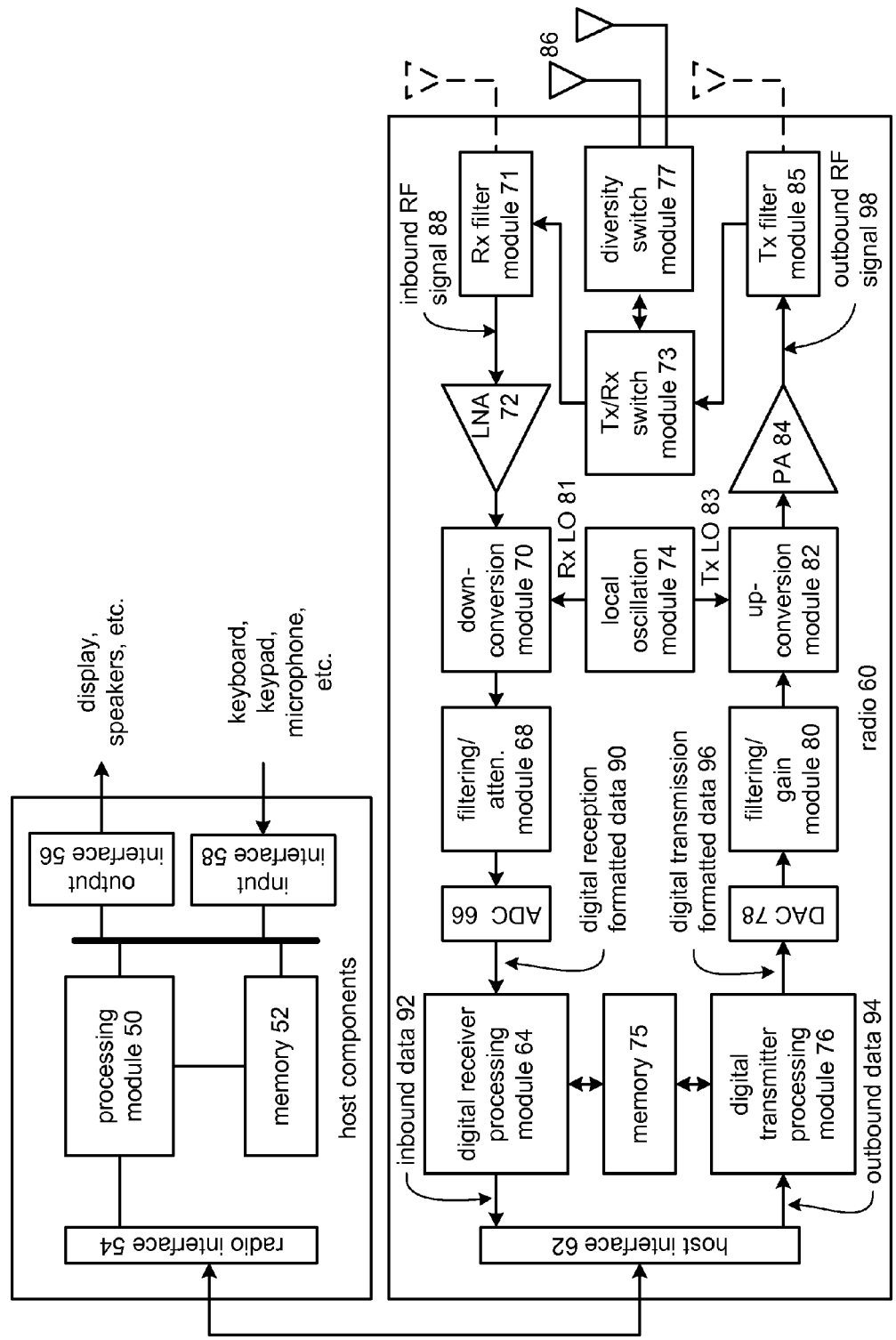
FIGS. 4A, 4B and 4C are block diagrams illustrating a Wireless Local Area Network device constructed according to a plurality of embodiments of the present invention.

FIG. 4A is a schematic block diagram illustrating a WLAN device. The WLAN host device represents any of the WAPs 22A and 22B, the laptop computers 36, the desktop computers 38, and the wireless terminals 40 of FIG. 3 and the various WLAN devices of FIG. 2. Generally, the WLAN device includes host device components and a radio 60. As illustrated, the host device components include a processing module 50, memory 52, radio interface 54, input interface 58 and output interface 56. The processing module 50 and memory 52 execute the corresponding instructions that are typically done by the host device.

The radio interface 54 allows data to be received from and sent to the radio 60. For data received from the radio 60 (for example, inbound data), the radio interface 54 provides the data to the processing module 50 for further processing and/or routing to the output interface 56. The output interface 56 provides connectivity to an output display device such as a display, monitor, speakers, et cetera, such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/attenuation module 68, an IF mixing down conversion stage 70, a receiver filter 71, a low noise amplifier 72, a transmitter/receiver (Tx/Rx) switch 73, a local oscillation module 74, memory 75, a digital transmitter processing module 76, a digital-to-analog converter 78, a filtering/gain module 80, an IF mixing up conversion stage 82, a power amplifier 84, and a transmitter filter module 85. Additionally, a diversity switch module 77 is coupled between Tx/Rx switch 73 and at least one antenna 86. The at least one antenna 86 may be a single antenna that is shared by the transmit and receive paths as regulated by the Tx/Rx switch 77, or may include a plurality antennas for the transmit path and receive path for one or more RF units. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 75 stores, and the processing module 64 and/or 76 executes, operational instructions corresponding to at least some of the functions described herein.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (for example, IEEE 802.11(a), IEEE 802.11(b), IEEE 802.11(g), et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, a WAP and/or another wireless communication device.

The radio 60 also receives an inbound RF signal 88 via the antenna 86, which was transmitted by a base station, a WAP, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/attenuation module 68. The filtering/attenuation module 68 may be implemented to filter and/or attenuate the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device components 18-32 via the radio interface 54.

As one of average skill in the art will appreciate, the wireless communication device of FIG. 4A may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 4B:
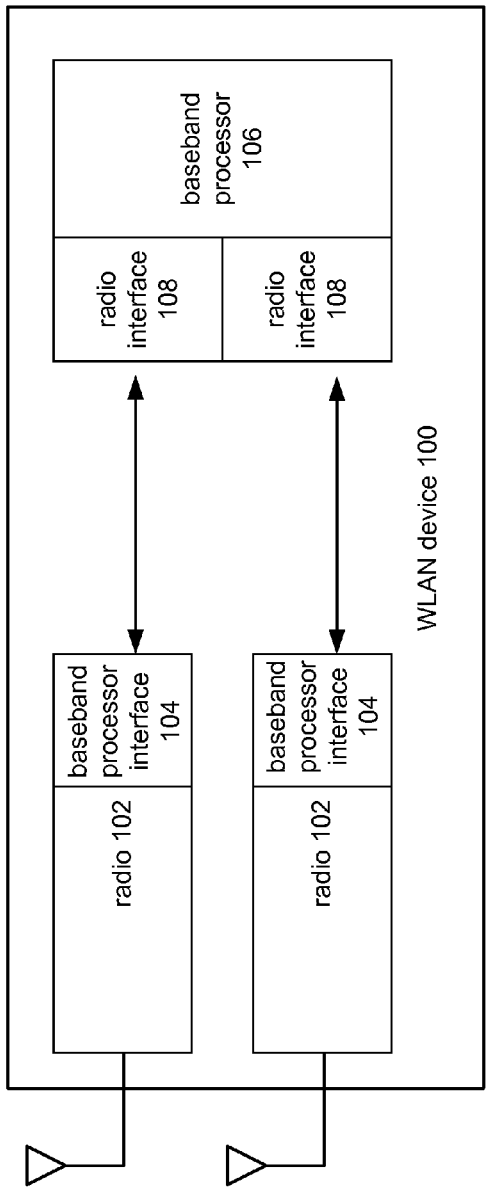

FIG. 4B is a functional block diagram of a WLAN device formed according to an embodiment of the invention. As may be seen, a WLAN device 100 includes two radios 102, each of which is coupled to a baseband processor interface 104 through which radios 102 communicate with a baseband processor 106 through radio interfaces 108. As may be seen, the embodiment of FIG. 4B of a WLAN device 100, the one baseband processor of WLAN device 100 communicates over a plurality of frequency bands through a plurality of radios 102. These communication channels may be operated simultaneously. Baseband processor 106 of WLAN device 100 includes at least one radio interface 108 for communicating with the two radios 102 though two interfaces 108 are shown for the described embodiment.

Figure 4C:
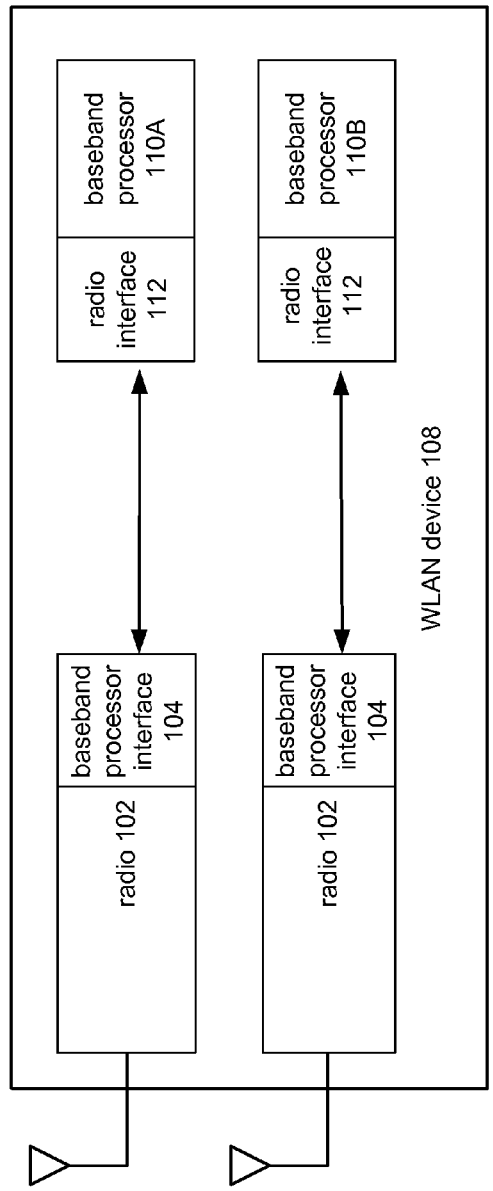

FIG. 4C is a functional block diagram of a WLAN device formed according to an embodiment of the invention. As may be seen, a WLAN device 108 includes two radios 102, each of which is coupled to a baseband processor interface 104 through which the radio's 102 communicate with baseband processors 110A and 110B through radio interfaces 112A and 112B. As may be seen, the embodiment of FIG. 4C of a WLAN device 76, the two baseband processors of WLAN device 108 communicate over a plurality of frequency bands through a plurality of radios 102. These communication channels may be operated simultaneously.

While FIGS. 4B and 4C show different configurations in terms of the baseband processors therein, they are similar in that both illustrate embodiments of a wireless access terminal that supports communication over a plurality of frequency bands and protocols (for example, 802.11(a), 802.11(b) and 802.11(g)). Moreover, each of these two embodiments supports selection of frequency bands according to signal quality in a given channel in each frequency band or according to availability. Significantly, though, these embodiments further support communication over a plurality of frequency bands and protocols simultaneously by one WLAN device.

In one embodiment, each of the WLAN devices as shown is formed in only one integrated circuit. In another embodiment, the baseband processors are separated from the radios. Here, the radios are formed on one integrated circuit while the baseband processor(s) are separate. Moreover, the embodiment of FIG. 4B illustrates one baseband processor that includes a plurality of radio interfaces for communication with the corresponding radios. FIG. 4C, on the other hand, illustrates an embodiment that includes a baseband processor for each radio interface.

In either embodiment, the baseband processors are formed to operate according to the respective protocol. For example, in the embodiment of FIG. 4C, one baseband processor may be formed to operate according to 802.11(a) requirements while a second baseband processor may be formed to operate according to 802.11(b) requirements. Nothing in FIGS. 4B and 4C should be taken to limit the number of baseband processors and corresponding radios. For example, the embodiment of FIG. 4C may be modified to include a third baseband processor and third radio to communicate according to another protocol including 802.11(g). Finally, FIG. 4A illustrates the specific components of a radio and the components of a host device. It is understood that the radios of FIGS. 4B and 4C may be formed to be similar in structure or may be varied in ways known by one of average skill in the art.

Figure 5:
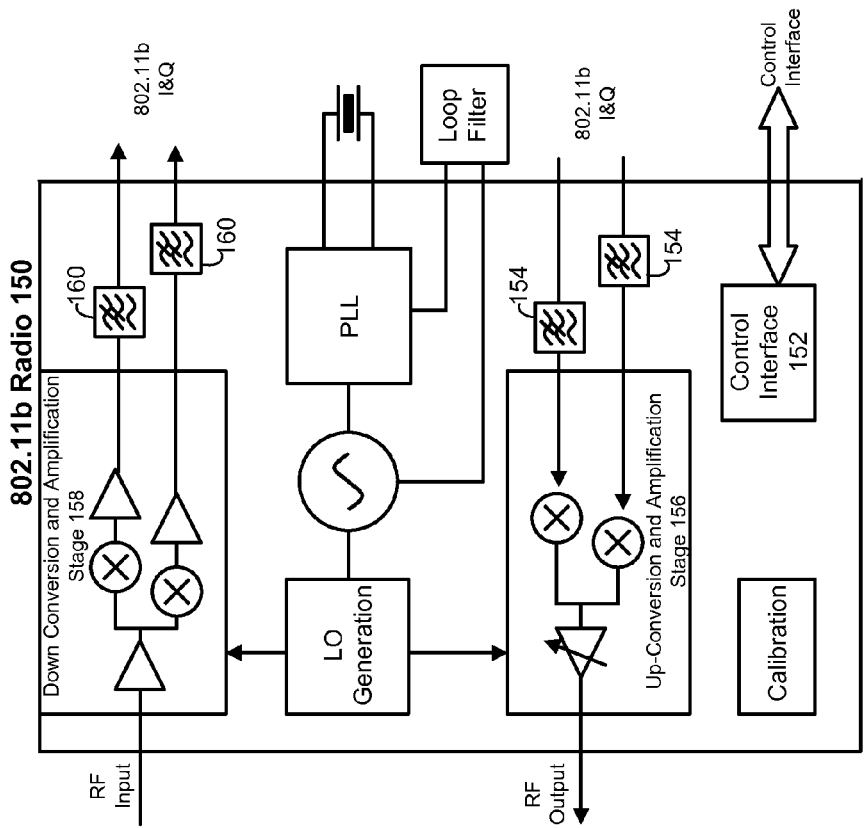
FIG. 5 is a block diagram illustrating an IEEE 802.11(b) radio that may be operated according to an embodiment of the present invention.

FIG. 5 is a block diagram illustrating an IEEE 802.11(b) radio 150 that may be operated according to an embodiment of the present invention. The structure of a radio that supports operation in differing frequency bands and according differing protocols will include a same/similar structure. Such structure is illustrated, in one embodiment, in FIG. 5. One difference between radios operating according to different protocols includes a local oscillation frequency generated by the PLL circuitry, as well as by operational logic of a corresponding baseband processor. A baseband processor, not shown in FIG. 5, provides control signals through control interface 152. I and Q data streams are produced to digital-to-analog converters 154 to convert the I and Q data streams to a I and Q baseband frequency modulated signals. The I and Q baseband frequency modulated signals are then produced to an up-conversion and amplification stage 156 where they are up-converted to radio frequency (RF) and are broadcast.

On a receive end of radio 150, a down conversion and amplification stage 158 receives RF signals, amplifies and down converts the RF signals to a baseband frequency signal (either directly or through a low intermediate frequency stage) to produce I and Q baseband frequency modulated signals from the received RF to analog-to-digital converters 160. Analog-to-digital converters 160 then convert the I and Q baseband frequency modulated signals to I and Q data streams that are produced to baseband processor.

Figure 6A:
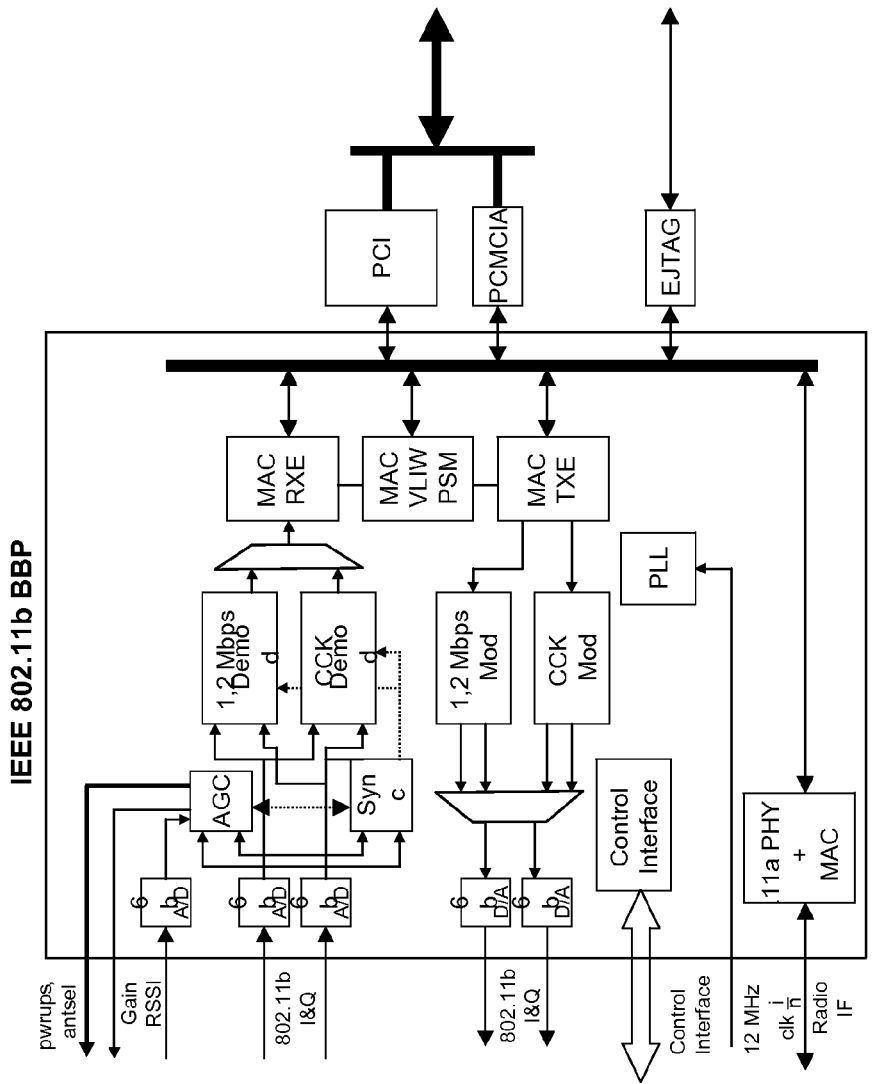
FIG. 6A is a block diagram illustrating an IEEE 802.11(b) baseband processor that may be operated according to an embodiment of the present invention.
Figure 6B:
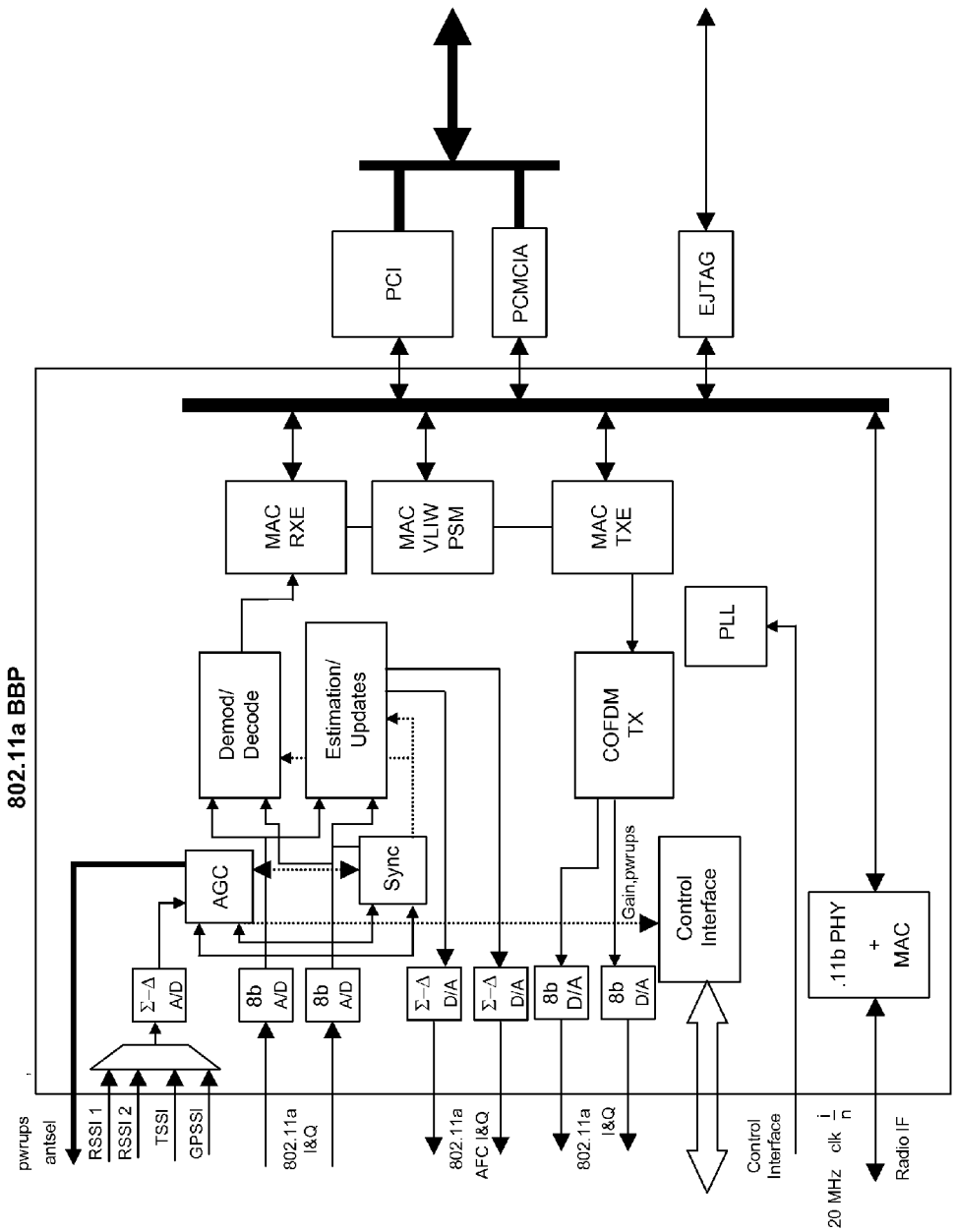
FIG. 6B is a block diagram illustrating an IEEE 802.11(a) baseband processor that may be operated according to an embodiment of the present invention.

FIG. 6A is a block diagram illustrating an IEEE 802.11(b) baseband processor that may be operated according to an embodiment of the present invention. FIG. 6B is a block diagram illustrating an IEEE 802.11(a) baseband processor that may be operated according to the embodiment of the present invention. Each of the baseband processors of FIGS. 6A and 6B include logic circuitry to support denied operation. For example, one 802.11(b) radio, as in FIG. 6A, includes only one gain level input (received signal strength indicator) reflecting a gain level of a signal. The 802.11(a) radio, however, includes two gain level inputs measuring signal strength and signal strength plus interference. The 802.11(a) radio baseband processor further includes corresponding logic for responding to the dual gain level inputs. The baseband processors of FIGS. 6A and 6B generate the control signals and the I and Q data streams that are produced to the radio 150 of FIG. 5 and receive the I and Q data streams from radio 150.

Figure 7:
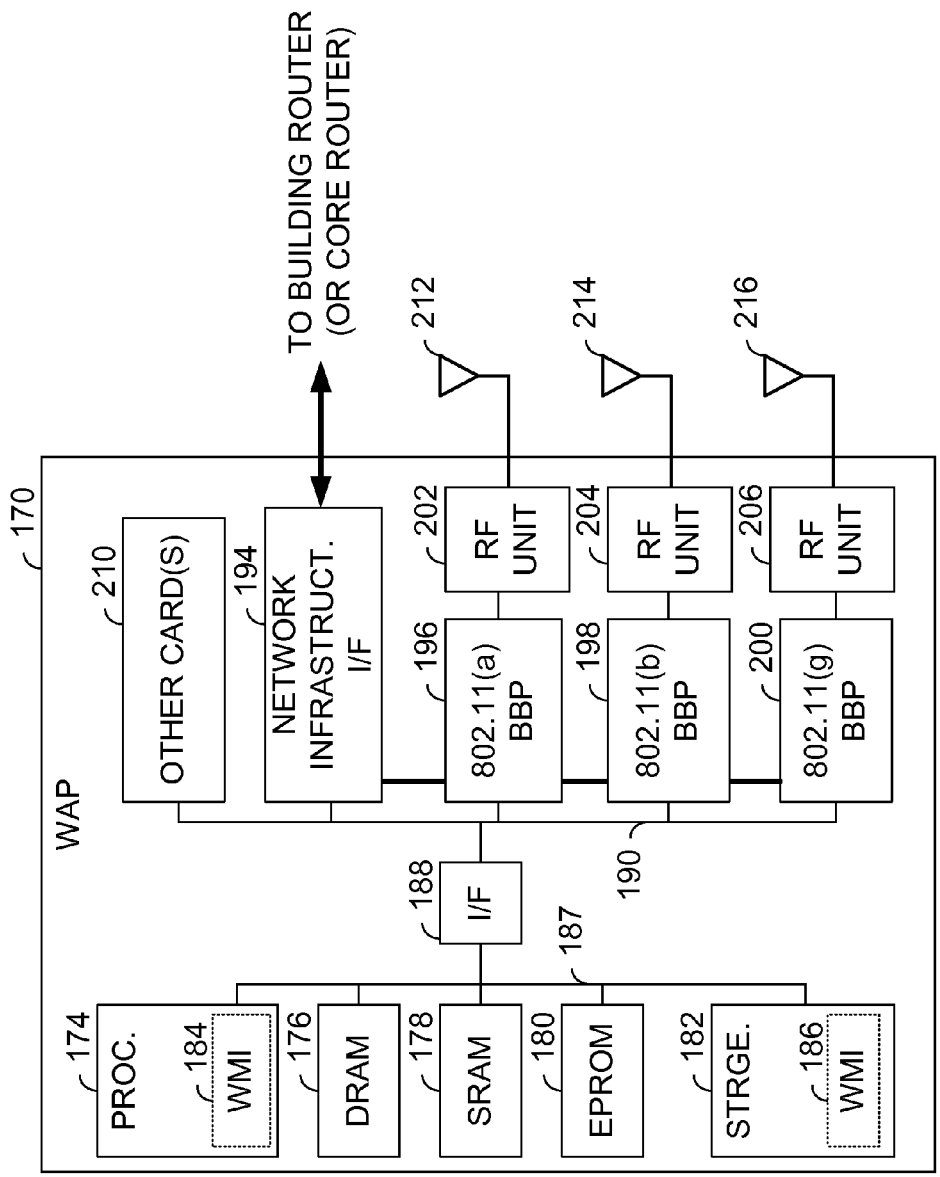
FIG. 7 is a block diagram illustrating a Wireless Access Point constructed according to an embodiment of the present invention.

FIG. 7 is a block diagram illustrating a Wireless Access Point 170 that is similar to WAPs 22A, 22B, 22C, and 22D as constructed according to an embodiment of the present invention. The WAP 170 includes a processor 174, dynamic RAM 176, static RAM 178, EPROM 180, and at least one data storage device 182, such as a hard drive, optical drive, tape drive, etc. These components (which may be contained on a peripheral processing card or module) intercouple via a local bus 187 and couple to a peripheral bus 190 via an interface 188.

Various peripheral cards couple to the peripheral bus 190. These peripheral cards include a network infrastructure interface card 194, which couples the WAP 170 to its servicing building router (or core router). Baseband processing cards 196, 198 and 200 couple to Radio Frequency (RF) units 202, 204, and 206, respectively. Each of these baseband processing cards 196, 198 and 200 performs digital processing for a respective wireless communication protocol, for example, 802.11(a), 802.11(b), and 802.11(g), serviced by the WAP 170. The RF units 202, 204, and 206 couple to antennas 212, 214, and 216, respectively, and support wireless communication between the WAP 170 and wireless subscriber units according to a desired protocol and corresponding operation. The number of antennas does not correspond necessarily, however, to the number of RF units 202, 204 and 206. In one embodiment, one RF unit with a plurality of antennas provides the RF communications. In another embodiment, all RF units are coupled to a single antenna or, alternatively, to a diversity switch module that itself is coupled to one or more antennas. The WAP 170 may include other card(s) 210 as well for other desired functionality. While the WAP 170 illustrated in FIG. 7 is shown to support three separate wireless communication protocols, other embodiments of the WAP 170 could support one, two, three or more than three communication protocols. While the structure of the WAP 170 is shown to have separate resources in servicing the differing communication protocols, some of these resources may be combined in other embodiments as shared resources, as shown, for example, in FIGS. 4B and 4C.

The WAP 170 performs operations at least partially as software instructions, that is, WMI. WMI 184 enable the WAP 170 to perform the operations. The WMI 186 are loaded into the storage unit 182 and some or all of the WMI 184 are loaded into the processor 174 for execution. During this process, some of the WMI 186 may be loaded into the DRAM 176.

A first operation according to an embodiment of the present invention occurs at transceiver startup. The transceiver may be a wireless access point (also known as a WAP, borrowing IEEE 802.11 terminology) or it may be a station or wireless terminal (also referred to as an STA in 802.11 terminology). If a transceiver is configured as a STA in ad hoc mode, at startup, it will need to select a band and a channel for transmission if it is founding the independent basic service set (IBSS). Similarly, if a transceiver is configured as a WAP, at startup, it selects a band and a channel for transmission by all stations in the basic service area (BSA) covered by the basic service set (BSS) that it establishes. The WAP selects the band that provides the highest signal to noise plus interference ratio. Interferers may be either co-channel interferers or adjacent channel interferers.

A second operation according to an embodiment of the present invention occurs during wireless terminal roaming. In the second case, a mobile STA that belongs to an extended service set (ESS) moves outside the range of the WAP with which it is associated and must find a new WAP. The WAPs provide a connection between a STA and a distribution system or backbone network. The WAPs also establish the coordination function (medium access etiquette) for each BSS. The ESS is very much like a large logical BSS that includes more than one WAP; the WAPs share a common distribution system or backbone network, which may be a wired network (for example Ethernet). A somewhat analogous system is cellular telephony, in which a mobile phone may roam from one cell's base station to another while maintaining an apparently seamless connection. It is not essential that all WAPs in an ESS use the same frequency band; hence the need for band selection logic. The protocol for association of the STA with an WAP is defined elsewhere (for example, IEEE 802.11-1999). In the case of 802.11, selection of a transmission band is not addressed by the published standards. The STA selects a WAP that provides the highest-rate, lowest outage probability connection. In IBSS Mode Start-up, fundamentally, the same logic is used in the founding of an IBSS for ad hoc networking.

When the WAP starts up, it selects a channel on which to operate its BSS from a set that is deemed allowable in the locale in which the WAP is to be operated, for example, premises defined in FIGS. 1-3. The first step involves scanning the bands for existing BSSs and foreign interferers. Two received signal strength indicators (RSSI) that enable this measurement. The RSSI, in general, is a function of the received signal's baseband I and Q channel magnitudes and should be a monotonic function of the received signal power $(|I|^2+|Q|^2)$. Some appropriate functions are $RSSI(|I|,|Q|)=k*\log(|I|^2+|Q|^2)+\text{offset}$, $RSSI(|I|,|Q|)=k*\log(\max(|I|,|Q|))+\text{offset}$, and $RSSI(|I|,|Q|)=k*\log(\max(|I|,|Q|)+\frac{1}{2}*\min(|I|,|Q|))+\text{offset}$; other functions are also appropriate as long as the they are monotonic functions of the input power. The first RSSI is a narrowband RSSI (NRSSI), which measures only the energy within the current channel in one of the bands. The second RSSI is a wideband RSSI (WRSSI), which measures energy in many channels adjacent to the current channel.

With these operations, BW[k] is defined as the bandwidth of the contiguous channels of the $k^{th}$ band. Define $f_c[k]$ as the center frequency of the contiguous channels of the $k^{th}$ band. $\beta[k]$ is defined as the bandwidth of a signal channel within this band; for 802.11(b) and (g), this is 5 MHz band and for 802.11(a), this is 20 MHz band. Define $\Delta[k]$ as the input bandwidth of the WRSSI detector in band k; the nominal value in the preferred embodiment is 70 MHz. First, a simple energy scan of all bands is performed by performing the following operations:

1. Set the current transceiver center frequency to $\beta[k]*\text{floor}((f_c[k]-BW[k]/2)/\beta[k])$.
2. Record one sample of the WRSSI detector output (r[l]), wait t microseconds, and repeat L times.

3. If the current transceiver center frequency <β[k]*floor(($f_c$[k]+BW[k]/2−Δ[k]/2)/β[k]), then increment the current transceiver center frequency by β[k]*floor (Δ[k]/(2*β[k])) and go to step 1.
4. If max(r[l])>threshold_band_occupied, then flag the band as occupied by setting a bit in the $k^{th}$ entry of the band status table.

Once all bands are scanned, the following operations are performed:
1. If all bands are unoccupied, then the best band is selected from a pre-computed band rank table. In the case of the 2.4 GHz and 5 GHz bands: (a) if DSSS/CCK and OFDM rates are available in the 2.4 GHz band, then the 2.4 GHz band will have higher rank (since path loss tends to be lower at lower frequency). (b) if only DSSS/CCK rates are available in the 2.4 GHz band, then the 5 GHz band will have higher rank (since it supports nearly 5 times the maximum physical-layer rate and the minimum sensitivities are about the same). The WAP will be aware of which rates it supports on power-up.
2. If at least one band is occupied, each channel in each occupied band is scanned for s milliseconds. If the NRSSI exceeds threshold_chan_occupied, signal_type in the Band/Channel Signal Scan of Table 1 is set to 1 and the NRSSI values are recorded (signal_type is initialized to 0 for all channels/bands.). Once the scan of all channels in all occupied bands is completed, the following metric is computed for each band: O[k]=S[k]*β[k]/BW[k], where S[k] is the number of occupied channels in the band. If all bands support the same maximum physical-layer rate, then the band with minimum O[k] is selected. Otherwise, the band that supports the maximum physical-layer rate and has at least one channel unoccupied is selected.

TABLE 1

Band/Channel Signal Scan

| 0 | Band | Chan. # | Signal type | NRSSI |
|---|---|---|---|---|
| 1 | Band | Chan. # | Signal type | NRSSI |
| . | . | . | . | . |
| M-1 | Band | Chan. # | Signal type | NRSSI |

M = (#bands) * (#channels)

With station roaming, a station may perform an active or passive scan for WAPs; this scanning occurs in the background, even while a station is actively communicating with an WAP with which it is associated. Roaming is initiated when some criterion related to the STA's ability to detect frames from the WAP indicates that a better WAP might be used within the ESS. Typically, there is some comparison of a performance metric, for example gain code, NRSSI, or a signal quality against a threshold. The gain code is a number that represents exactly one value for the required RF and baseband/IF amplification to detect the frame; many gain codes may map to the same gain value in dB, or the mapping may be one-to-one. The signal quality (SQ) is a rough representation of the ratio of the desired signal power to the power of noise, interference, and distortion terms; the distortion may be a linear impairment (for example multipath) or it may be a nonlinear impairment (for example amplifier distortion causing self-noise).

WAPs send out beacons at a regular interval, which may vary somewhat from BSS to BSS; these could be used by a STA in a passive scan to determine the set of WAPs in its ESS. Beacons are well-formed frames that provide a time reference and other critical information to stations within a BSS. However, active scanning is primary method used in the preferred embodiment, since the beacon interval may be long and the WAP may not advertise its SSID in the beacon. In an active scan, the STA sends probe requests on a channel and anticipates a probe response from an WAP that matches its SSID; this interaction is described in IEEE 802.11-1999. If no probe response is received, at the expiration of the specified duration, the STA moves back to the channel on which it is associated with the WAP for another specified duration (to ensure continuity of communications), then on to a new channel to scan in the first band. When all channels within a band are scanned, the STA switches to the next band, until all channels in all bands are scanned; alternatively, two bands may be scanned simultaneously with the proposed architecture. If a probe response is detected on a channel, the gain code, measured NRSSI, and signal quality associated with that frame are stored in a table, like that shown in Table 2.

TABLE 2

Stored Channel Metrics

| 0 | Band | Chan. # | AP MAC ADDR | Metrics |
|---|---|---|---|---|
| 1 | Band | Chan. # | AP MAC ADDR | Metrics |
| . | . | . | . | . |
| N-1 | Band | Chan. # | AP MAC ADDR | Metrics |

Metrics include max. recorded NRSSI and/or SQ and/or min. recorded gain code.

The decision can be made using a function only of received signal strength or by some combination of received signal strength and estimated interference plus noise. Either metric may be used with side information about the type of traffic detected. All of the following methods may be enabled:
1. Received Signal Strength Driven Decision;
2. Received Signal Strength Plus Foreign-ESS Transmission Driven Decision;
3. Signal Quality Driven Decision; and
4. Signal Quality Plus Foreign-ESS Transmission Driven Decision.

With the Received Signal Strength Driven Decision, if the STA receives M consecutive frames from the WAP with either NRSSI less than a threshold or gain code greater than a threshold or if it fails to receive an ACK for R consecutive transmissions of the same frame to the WAP, the STA enters a search for a new WAP, using the results of the background active scan. Gain code can be substituted for NRSSI in the tests, since it is simply a function of 1/(NRSSI).

TABLE 3

Channel/Band information

| 0 | Band | Chan. # | AP MAC ADDR | Probe Metrics | Foreign Metrics |
|---|---|---|---|---|---|
| 1 | Band | Chan. # | AP MAC ADDR | Probe Metrics | Foreign Metrics |
| . | . | . | . | . | . |
| N-1 | Band | Chan. # | AP MAC ADDR | Probe Metrics | Foreign Metrics |

Metrics include max. recorded NRSSI and/or SQ and/or min. recorded gain code.

First, the channel/band information of Table 3 is sorted by either NRSSI or gain code. If the WAP/channel/band with max(NRSSI)−max(NRSSI_current_channel) exceeds another threshold (thd_roam_nrssi) or min(gain_code)−min (gain_code_current_channel) drops below the equivalent threshold (thd_roam_gc), then the WAP will select that new WAP/channel/band. The current channel values are the stored values from the latest frame received at the STA from the current WAP. The best WAP may be in a band different from the band over which communication was initiated.

With the Received Signal Strength Plus Foreign-ESS Transmission Driven Decision, if the STA receives M consecutive frames from the WAP with either NRSSI less than a threshold or gain code greater than a threshold or if it fails to receive an ACK for R consecutive transmissions of the same frame to the WAP, the STA enters a search for a new WAP, using the results of the background active scan.

The Received Signal Strength Plus Foreign-ESS Transmission Driven Decision combines active scanning (using probe requests directed at the current SSID), as in the previous method, with passive scanning for beacons. The NRSSI and/or gain codes of probe responses are stored per channel/band for those channels on which probe responses are detected (as above). In addition, the maximum NRSSI and/or minimum gain codes of all detected frames whose SSID does not match the current SSID in the STA are stored, per channel. The expanded tables are shown in Table 3.

First, the intersection of the set of channels on which probe responses were received and the set of channels on which foreign traffic was detected is taken; that is all channels on which either foreign traffic was detected or no probe response was detected are excluded. If this set of channels is not empty, then it is sorted by either probe response NRSSI or gain code, as above. If the WAP/channel/band with max(NRSSI)–max(NRSSI_current_channel) exceeds another threshold (thd_roam_nrssi) or min(gain_code)–min(gain_code_current_channel) drops below the equivalent threshold (thd_roam_gc), then the WAP will select that new WAP/channel/band.

If no channel from the intersection set meets this criterion, then the intersection of the set of channels with probe responses and the set of channels with foreign traffic is sorted by the value (NRSSI_probe_response–max(NRSSI_foreign)) or (min(gain_code_foreign)–gain_code_probe response). If the WAP/channel/band on which the maximum difference occurs also meets the additional criterion max(NRSSI_current_channel) is greater than another threshold (thd_roam_nrssi) or min(gain_code)–min(gain_code_current_channel) is less than the equivalent threshold (thd_roam_gc), then the WAP will select that new WAP/channel/band. The current channel values are the stored values from the latest frame received at the STA from the current WAP.

If this channel does not meet the additional criterion, then the channel with second largest difference (NRSSI_probe_response–max(NRSSI_foreign)) or (min(gain_code_foreign)–gain_code_probe response) is selected, and the additional criterion is tested, and so on.

The Signal Quality Driven Decision methodology is the same as the received signal strength driven decision logic, except that signal quality is substituted for received signal strength.

The Signal Quality Plus Foreign-ESS Transmission Driven Decision technique is the same as the received signal strength plus foreign-ESS transmission driven decision logic, except that signal quality is substituted for received signal strength.

FIG. 8 is a flow chart illustrating one method for selecting a channel according to a an embodiment of the present invention. Initially, all frequency ranges within a frequency band are searched for availability (step 220). This step includes searching defined channels, as well as searching frequency ranges that are wider than any one channel. In one embodiment, the signal energy in an entire band is measured with a wideband RSSI measuring circuit. More specifically, all channels are searched beacons thereon. In searching a channel for a beacon, the dwell time per channel is a function of the expected transmission rate of such beacons according to the type of communication standard protocol being implemented and corresponding technology. One of average skill in the art can readily determine an appropriate dwell time according to known design constraints. In general, however, a trade off exists between the probability of finding a beacon versus the amount of time taken to detect the beacon. Selecting a dwell time that guarantees locating a beacon could cause the total search algorithm to take longer than an acceptable amount of time.

As a part of searching channels for beacons, the embodiment includes creating a group or list of channels for which no beacon was detected (step 224). Microcode of the device may be modified to sample the gain code (in phyregs space) periodically (for example, every 10 micro-seconds) (step 228) and then store it to shared memory only if the value is smaller than a previously stored value (step 232).

FIG. 9 is a flow chart illustrating a method for selecting channels. Generally, any channel of a set of channels on which a beacon is detected is rejected and removed from the set (step 236). Thereafter, the invention includes determining if there are any channels left or remaining in the set of channels (step 240). If so, a channel having the maximum signal-to-signal plus noise ratio is selected of the remaining channels in the set (step 244). Otherwise, if there are no remaining channels in the set, then the channel having the maximum minimum gain value is selected (step 248).

Figure 10:
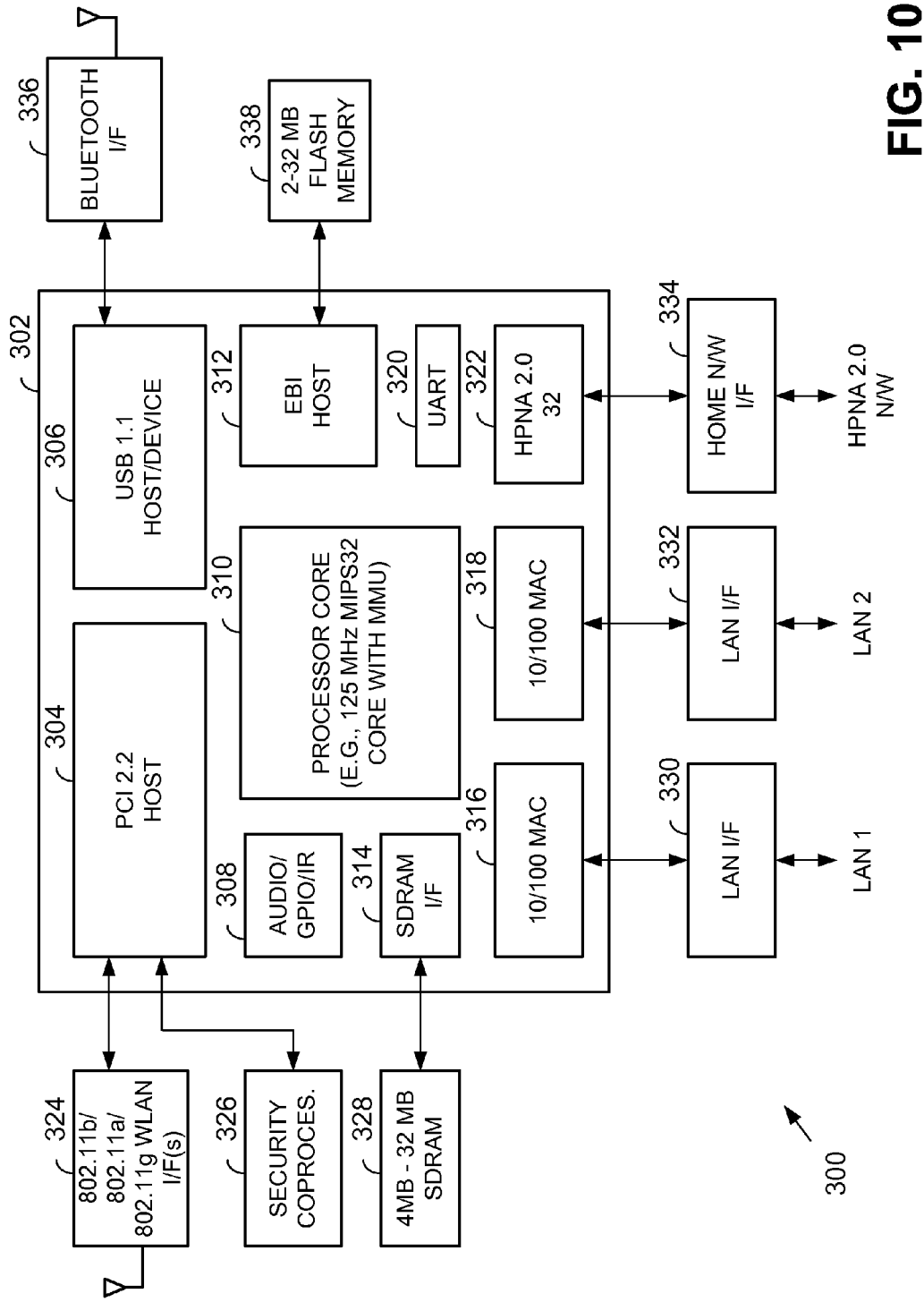
FIG. 10 is a block diagram illustrating a gateway that supports WLAN communications in multiple communication protocols and in multiple frequency bands according to an embodiment of the present invention.

FIG. 10 is a block diagram illustrating a gateway that supports WLAN communications in multiple communication protocols and in multiple frequency bands according to an embodiment of the present invention. The gateway 300 includes a gateway processor 302 that couples to WLAN interface 324, a security coprocessor 326, Synchronous Dynamic Access Memory (SDRAM) 328, LAN interfaces 330 and 332, Home N/W interface 334, a Bluetooth interface 336, and Flash memory 338. The gateway processor 302 includes a PCI interface 304, a USB interface 306, an audio/general purpose input-output/infrared interface 308, a processor core 310, an EBI interface 312, an SDRAM interface 314, LAN MACs 316 and 318, a Universal Asynchronous Receive-Transmit (UART) interface 320, and a home networking interface 322.

The PCI interface 304 couples the gateway processor 302 to the WLAN interface 324. The WLAN interface 324 supports 802.11(a), 802.11(b), and/or 802.11(g) WLANs in a manner similar to what is described herein. The USB interface 306 interfaces the gateway processor 302 to a Bluetooth interface 336. The PCI interface 304 also couples the gateway processor 302 to the security coprocessor 326. The SDRAM interface 314 couples the gateway processor 302 to SDRAM 328. The LAN MACs 316 couple the gateway processor 302 to LAN interfaces 330 and 332. The home networking interface 322 couples the gateway processor 302 a home networking interface 322. The EBI interface 312 couples the gateway processor 312 to flash memory 338. Generally, gateway processor 302 operates to couple 802.11(x) terminals to Bluetooth terminals to local area networks.

Figure 11:
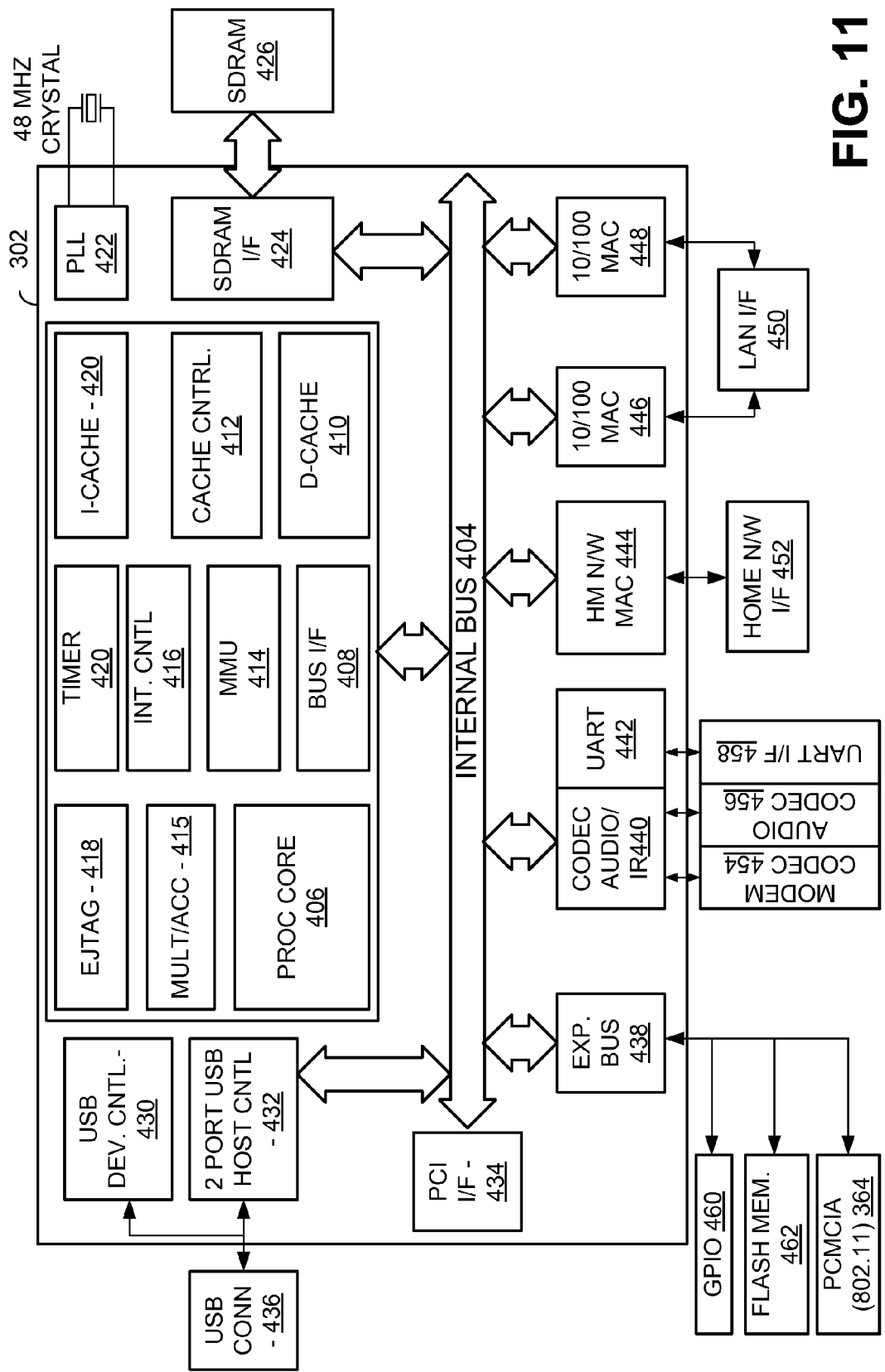
FIG. 11 is a block diagram illustrating in more detail the gateway of FIG. 10.

FIG. 11 is a block diagram illustrating in more detail the gateway of FIG. 10. As shown, an internal bus 404 intercouples the components of the gateway processor 302. In particular, the gateway processor 302 includes a processor module having a processing core 406, a bus interface 408, a D-cache 410, a cache controller 412, a Memory Management Unit (MMU) 414, a multiply/accumulate block 415, an interrupt controller 416, an EJTAG block 418, a timer 420, and an I-cache 420. The gateway processor 1002 further includes a PLL 422 that couples to an external crystal and that provides a clock signal. An SDRAM interface 424 couples to internal bus 404 and to external SDRAM 426.

A USB device controller 430 and USB host controller 432 couple to internal bus 404 and to a USB connector 436. A PCI interface 434 also couples to the internal bus 404 and services PCI interconnectivity. An expansion bus interface 438 couples to the internal bus 404 and also to a General Purpose Input/Output interface 460, a flash memory 462, and to a PCMCIA bus 464 that supports communication with the WLAN interface(s) 1024. A CODEC/AUDIO/IR interface 440 and UART 442 couple to the internal bus 404 and to a modem CODEC 454, and audio CODEC 456, and a UART I/F 458. The home networking MAC 444 couples to the internal bus 404 and to a home networking interface 452. The LAN MACs 446 and 448 couple to one or more LAN interfaces 450.

The processor core 406 includes a Wi-Fi compliant access point driver, BSP code and residential gateway application code, enabling the gateway to support advancing wireless technology. The software running on the processor core 406 allows a single instance of the software to support current and future wireless LAN standards. Thus, the gateway addresses IEEE 802.11(b), 802.11(g) and 802.11(a/b/g) technologies with a single platform by using particular WLAN interfaces.

Figure 12:
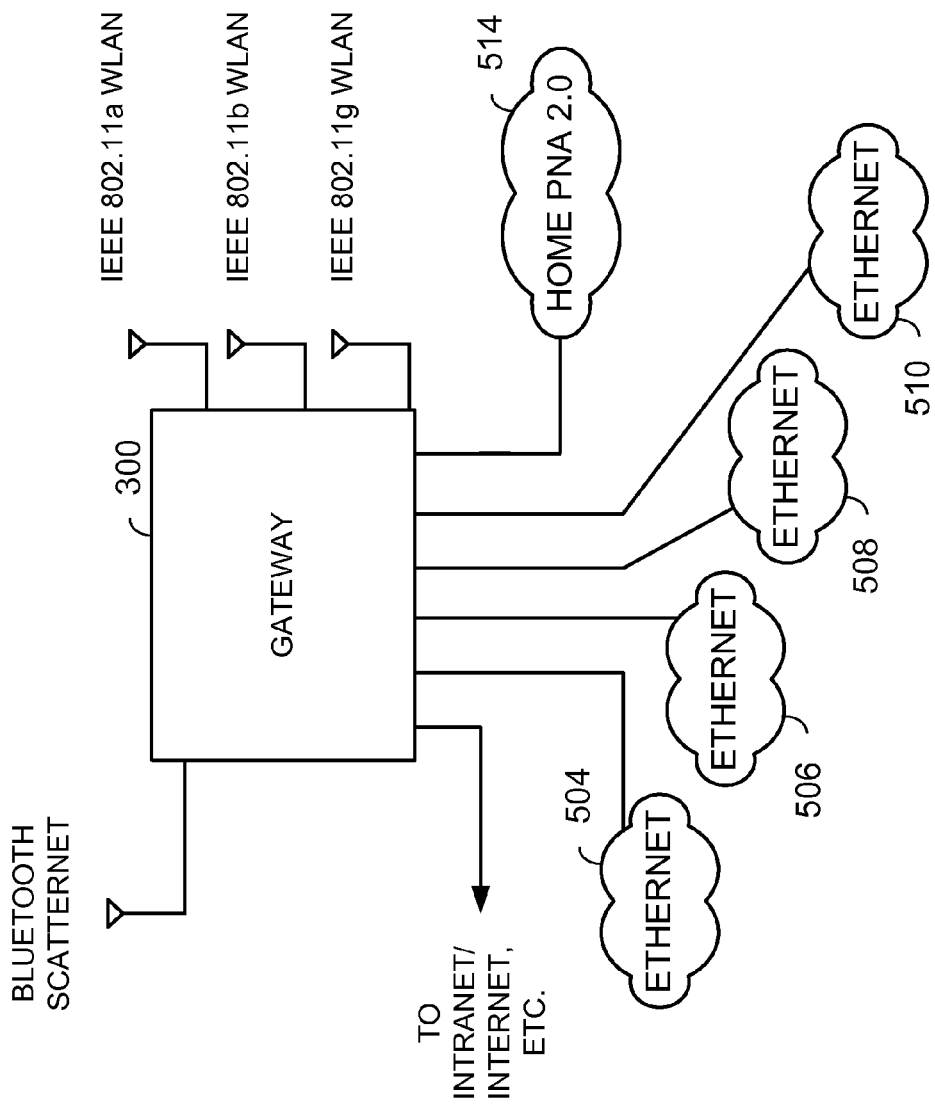
FIG. 12 is a system diagram illustrating the gateway of FIG. 10 as installed according to an embodiment of the present invention.

FIG. 12 is a system diagram illustrating the gateway of FIG. 10 as installed according to an embodiment of the present invention. As shown, the gateway 300 may support communications for one or more Bluetooth scatternets, an IEEE 802.11(a) WLAN, an IEEE 802.11(b) WLAN, and/or an IEEE 802.11(g) WLAN. The gateway 300 also may support communications for Ethernets 504, 506, 508, and 510, for a home phone line network 514, and a connection to an Intranet/Internet.

FIG. 13 is a flow chart illustrating a method for selecting a frequency band of operation of a plurality of frequency ranges in a wireless packet-based network. The method begins at step 602 determining a plurality of quality indicators for at least two frequency ranges of the plurality of frequency ranges. At step 604, a composite metric is determined for each of the plurality of frequency ranges that includes at least two of the plurality of quality indicators. A comparison of the quality indicators for each of the frequency ranges is made at step 606, in which the composite metric of at least two of the plurality of frequency ranges are compared.

Based on the comparison, at least one of another frequency range of the plurality of frequency ranges is selected as the frequency band of operation or another channel of the frequency band of operation for continued operation in step 608. In the selection, when all of the plurality of frequency bands are unoccupied, the another frequency range selection is from a pre-computed frequency band rank table that is based at least in part on the composite metric for each of the plurality of frequency ranges.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (that is, where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, et cetera, provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented various embodiments for wireless communications in a wireless communication system that includes a plurality of wireless communication devices of differing protocols. As one of average skill in the art will appreciate, other embodiments may be derived from the teachings of the present invention without deviating from the scope of the claims.

What is claimed is:

1. A method for selecting a frequency band of operation of a plurality of frequency ranges supported by a Wireless Local Area Network (WLAN) device, the method comprising:
   for each of the plurality of frequency ranges supported by the WLAN device, determining, by a processor, a plurality of quality indicators based at least in part on probe responses;
   determining, by the processor, a composite metric for each of the plurality of frequency ranges that includes at least two of the plurality of quality indicators; and
   based upon a comparison of the composite metric of at least two of the plurality of frequency ranges, selecting, by the processor, at least one of another frequency range as the frequency band of operation or another channel of the frequency band of operation for subsequent wireless communication, the at least one of another frequency range being selected from a frequency band rank table, the at least one of another frequency range supporting a maximum physical-layer rate as against unselected ones of the plurality of frequency ranges.

2. The method of claim 1, wherein the plurality of quality indicators includes a desired channel power and an undesired interference power for the selected frequency range and a channel within the frequency range.

3. The method of claim 2, wherein the undesired interference power includes in-channel interference and adjacent channel interference for the another channel in the frequency range.

4. The method of claim 1, further comprising:
   selecting, by the processor, a communication protocol for operation from a plurality of available communication protocols.

5. The method of claim 1 wherein the selecting, by the processor, the another frequency range includes a further frequency range as the frequency band of operation.

6. The method of claim 1 further comprising:
   searching, by the processor, all channels from a group of channels to determine whether a beacon is detected.

7. The method of claim 6 further comprising:
   creating, by the processor, a group of channels for which no beacon was detected.

8. The method of claim 7 further comprising:
sampling a gain code in phyregs space periodically.

9. The method of claim 8 further comprising:
storing the gain code when the gain code value is less than a previously stored value.

10. The method of claim 9 wherein the storing the gain code is stored in shared memory.

11. The method of claim 6 wherein a channel is removed from the group of channels when a beacon is detected.

12. The method of claim 11 further comprising determining, by the processor, whether any channels remain in the group of channels.

13. The method of claim 12 wherein a channel of the group of channels having a maximum signal-to-signal plus noise value is selected of the group of channels for which no beacon is detected.

14. The method of claim 12 wherein a channel of the group of channels having a maximum signal-to-signal plus noise value is selected of the group of channels to select an optimal channel of the group of channels for which a beacon was detected.

15. A method for selecting a frequency band of operation of a plurality of frequency ranges in a wireless packet-based network, the method comprising:
determining, by a processor, a plurality of quality indicators for at least two frequency ranges of the plurality of frequency ranges;
determining, by the processor, a composite metric for each of the plurality of frequency ranges that includes at least two of the plurality of quality indicators based at least in part on probe responses; and
based upon a comparison of the composite metric of at least two of the plurality of frequency ranges, selecting, by the processor, at least one of another frequency range of the plurality of frequency ranges as the frequency band of operation or another channel of the frequency band of operation for subsequent wireless communication, wherein when all of the plurality of frequency bands are unoccupied, the another frequency range from a pre-computed frequency band rank table that is based at least in part on the composite metric for each of the plurality of frequency ranges, the at least one of another frequency range supporting a maximum physical-layer rate as against unselected ones of the plurality of the frequency ranges.

16. The method of claim 15, wherein the plurality of quality indicators includes a desired channel power and an undesired interference power for the selected frequency range and a channel within the frequency range.

17. The method of claim 16, wherein the undesired interference power includes in-channel interference and adjacent channel interference for the another channel in the selected frequency range.

18. The method of claim 15, further comprising selecting, by the processor, a communication protocol for operation from a plurality of available communication protocols.

19. A method for selecting a frequency band of operation of a plurality of frequency ranges in a wireless packet-based network, the method comprising:
determining, by a processor, a plurality of quality indicators for at least one frequency range of the plurality of frequency ranges;
determining, by the processor, a composite metric for each of the plurality of frequency ranges that includes at least two of the plurality of quality indicators based at least in part on probe responses conducted over time; and
based upon a comparison of the composite metric of each of the plurality of frequency ranges, selecting, by the processor, another frequency range as the frequency band of operation for subsequent wireless communication, the at least one of another frequency range being selected from a frequency band rank table, the at least one of another frequency range supporting a maximum physical-layer rate as against unselected ones of the plurality of frequency ranges.

20. The method of claim 19 wherein the selecting, by the processor, the another frequency range includes a further frequency range as the frequency band of operation configured to provide communicating over at least one channel in each of the another and the further frequency ranges.

* * * * *